Sept. 18, 1962   A. F. SMITH   3,054,729
DISTILLATION FILM WIPING APPARATUS
Filed Nov. 28, 1958   3 Sheets-Sheet 3

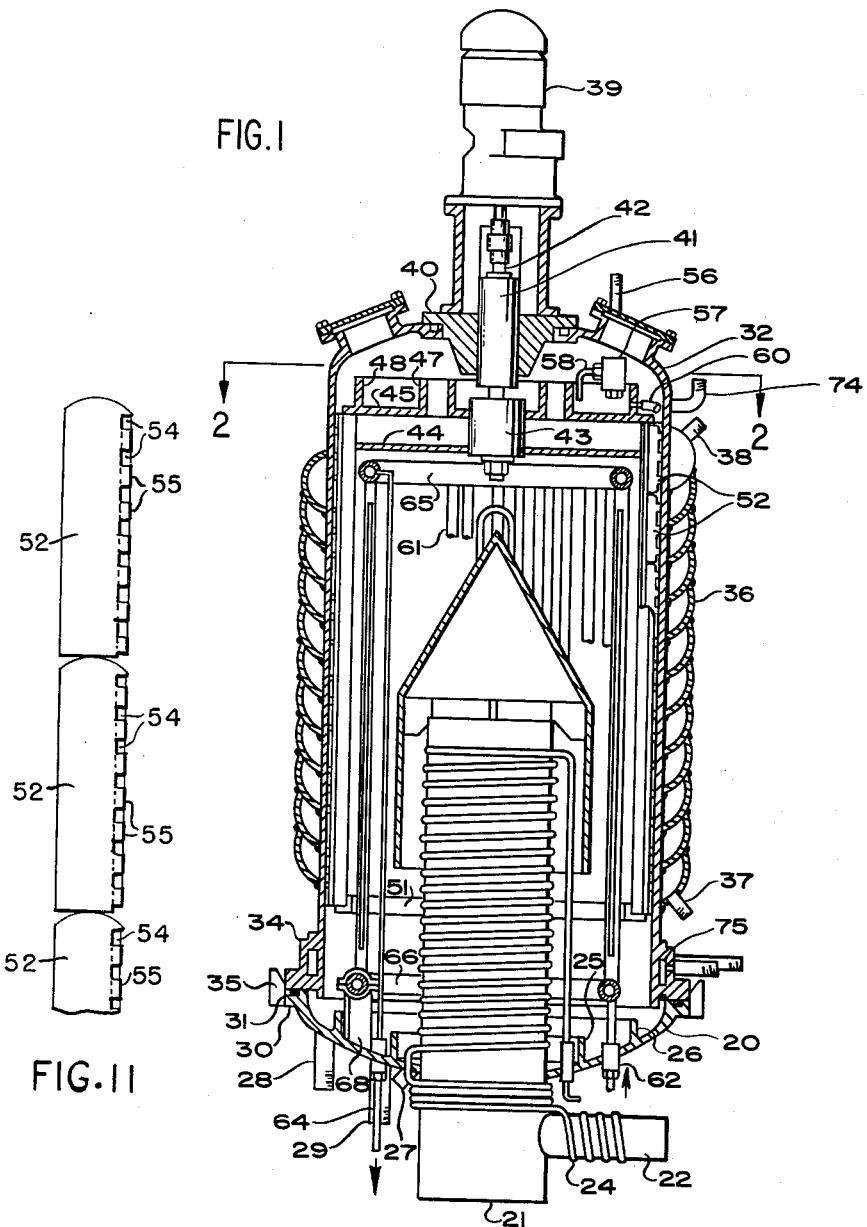

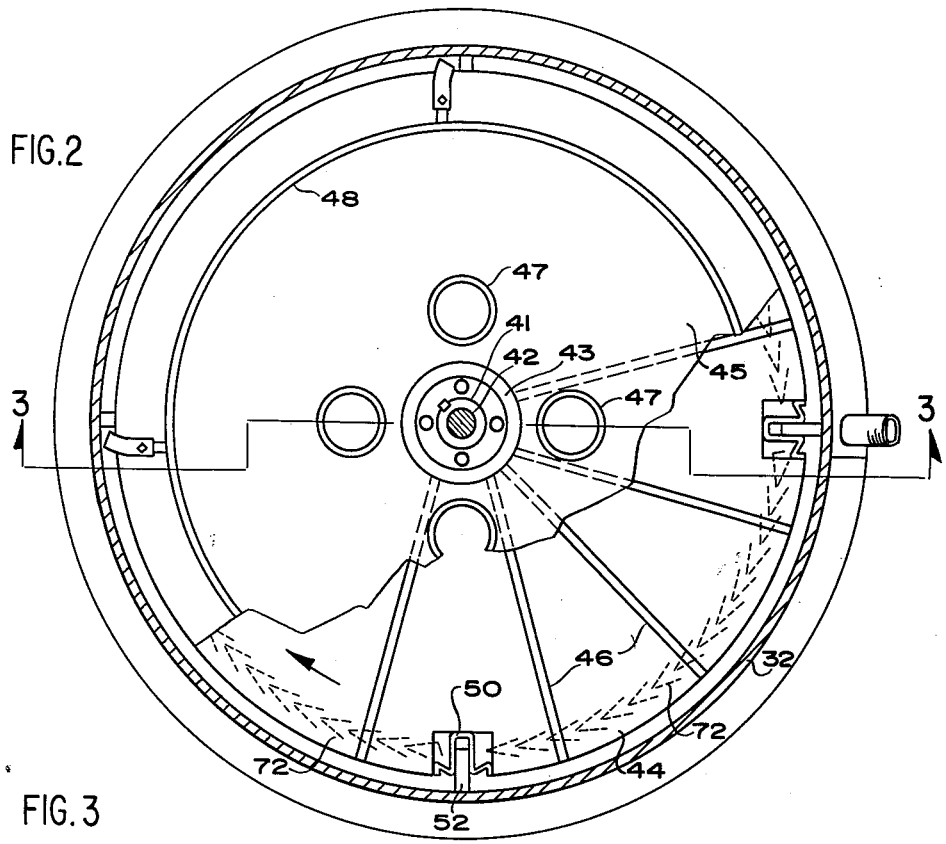
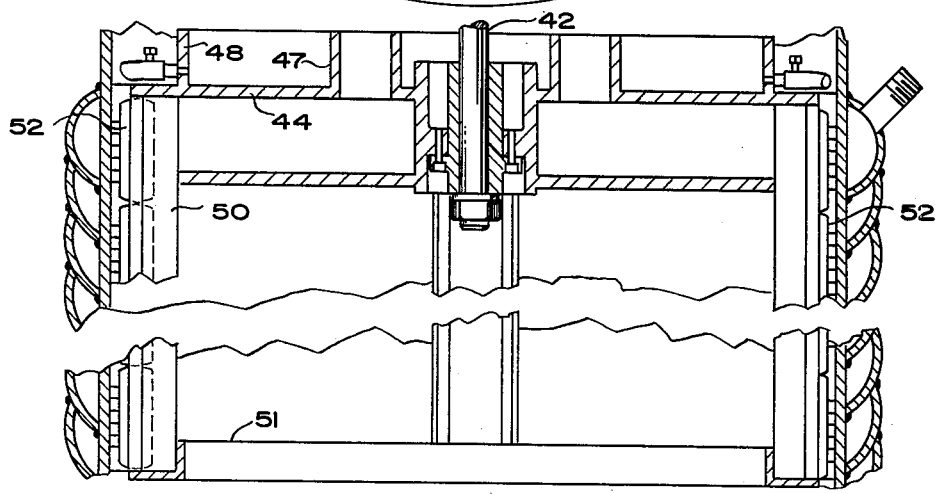

INVENTOR.
ARTHUR F. SMITH
BY Frank E. Robbins

United States Patent Office 3,054,729
Patented Sept. 18, 1962

3,054,729
DISTILLATION FILM WIPING APPARATUS
Arthur F. Smith, 1516 Lake Road, Webster, N.Y.
Filed Nov. 28, 1958, Ser. No. 777,072
3 Claims. (Cl. 202—236)

This invention relates to heat exchange apparatus. More particularly, this invention relates to heat exchange apparatus that is useful for heating thermally unstable liquids and viscous liquids that are characterized by low thermal conductivity.

The efficiency of conventional heat exchange equipment, in which a fluid heat exchange medium is used to heat a liquid, is low because of the fact that a thin viscous film always forms on the surface of the wall that is employed to separate the liquid from the heat exchange medium. Even when the liquid is maintained in turbulent flow, there is a residual film on the wall surface, that persists from viscous flow. If heat is passing through the wall to the fluid, this comparatively stagnant film retards heat transfer, since all of the heat reaching the liquid must pass through this film by conduction, and the thermal conductivity of a liquid is almost invariably low. Therefore, although this film of liquid may be extremely thin, the resistance that it offers to the flow of heat may be very large. If the liquid is maintained in turbulent flow, the body of liquid, exclusive of this film on the wall, rapidly equalizes in temperature because of its turbulence.

Attempts have been made in the past to render heat exchange equipment more efficient by employing agitator vanes to agitate the liquid in close proximity to the wall surface, to maintain the liquid in a turbulent state, in an attempt to transform the characteristics of the viscous film on the wall surface to those of a turbulent liquid. In one apparatus of this type, for example, the body of the heat exchanger is a jacketed metallic shell having an upright axis to permit the liquid that is to be heated to fall downwardly over the inner surface of the shell in a thin film. A plurality of vanes are mounted within the shell, for rotation about a vertical axis. These vanes are so proportioned that their outer edges pass over the inner cylindrical surface of the heat exchanger shell, with but a very small clearance. In operation of a device of this type, sufficient liquid is supplied to the shell, at its upper end, to form a downwardly flowing film of sufficient thickness, initially, that the film thickness exceeds the clearance of the vanes from the wall surface. Then, as the vanes are rotated, the liquid film is disrupted and a mass of liquid is pushed ahead of each vane, so that the liquid film is constantly disrupted and renewed.

Apparatus of this type is highly effective for evaporating and concentrating many liquids. However, it suffers from the disadvantage that it is practically impossible to obtain the same clearance from the wall surface on all vanes. There is therefore a tendency for the vane with least clearance to carry the greatest load, and this puts an undesirably heavy strain on that vane, and increases the rate of wear on the bearings. Moreover, it is very difficult to form the cylindrical surface of the heat exchanger so that it is true, and thus, some places on the heat exchanger surface may have greater clearance from the vane edges than others; and this leads to charring, burning, and the formation of hot spots. Furthermore, since the vanes actually are pushing the liquid around, a relatively large amount of power is consumed.

In addition to the foregoing disadvantages, apparatus of the agitated vane type does not overcome the basic problem of improving the heat transfer characteristics of the thin viscous film on the wall surface, since there is always a clearance between the vane edges and the wall surface, and this clearance is almost inevitably greater than the film thickness. Moreover, the agitation that occurs fails to disrupt the film to any material degree.

Another major drawback of most conventional heat exchange equipment is that the heat exchange medium itself, whether in liquid or vapor form, seldom is maintained in turbulent flow, and it also tends to form a thin viscous film on its surface of the heat exchanger wall, which further lowers the effectiveness of the apparatus for heat transfer.

One object of the present invention is to provide heat exchange equipment of the falling film type, for liquids, that has greatly improved heat exchange characteristics and efficiency.

Another object of the invention is to provide heat exchange apparatus of the falling film type, for liquids, in which there is substantially complete freedom from burning, charring, and hot spots.

Another object of the invention is to provide heat exchange apparatus for liquids, of the falling film type, in which the falling film is continuously removed and renewed on the heat exchange surface, and in which there is relatively low power consumption per unit volume of liquid treated.

Another object of the invention is to provide heat exchange apparatus for liquids, of the falling film type, in which the heat retardant effects of thin viscous surface films of liquid, that characterizes conventional falling film heat exchangers, are minimized or substantially eliminated.

Still another object of the invention is to provide heat exchange apparatus for liquids, of the falling film type, in which the heat exchange medium is maintained in turbulent flow while it is in heat exchange contact with the wall of the heat exchange apparatus.

A further object of the invention is to provide equipment for evaporation, concentration, and distillation, that is characterized by improved heat transfer characteristics and good thermal economy.

Other objects of the invention will be apparent hereinafter from the specification and from the recital of the appended claims.

In the drawings:

FIG. 1 is a part axial section, part elevation, of a heat exchanger constructed according to one embodiment of this invention, and that is particularly adapted for use in high vacuum distillation;

FIG. 2 is a section taken on line 2—2 of FIG. 1, looking in the direction of the arrows, and on an enlarged scale, with the feed plate partly broken away to show the underlying structure of the rotor;

FIG. 3 is a section taken approximately on the line 3—3 of FIG. 2;

FIG. 11 is a fragmentary, side elevation, on an enlarged scale, of a column of wiper blades.

Figure 4:
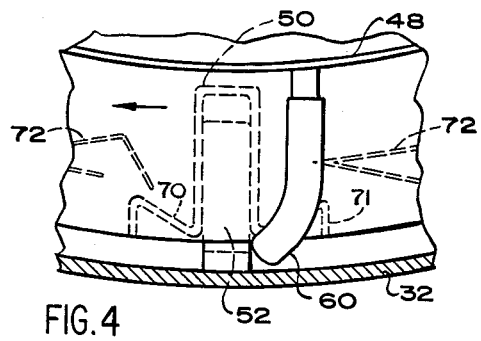
FIG. 4 is a transverse fragmentary section, on a further enlarged scale, taken substantially on the line 2—2 of FIG. 1 looking in the direction of the arrows, and showing in dotted lines the dispositions of a wiper and its retainer beneath the feed plate and of the feed nozzle that is mounted on the feed plate.

Heat exchangers constructed according to my invention can be used for a variety of purposes, such as, for example, the sterilization of milk, concentration of fruit juices, low pressure purification of plasticizers, and high vacuum recovery of vitamins from sources in which they occur naturally, such as, for example, the recovery of vitamin A from fish oils. To illustrate the invention, I have shown in the drawings, and will presently describe, a high vacuum or molecular still that embodies my invention. Stills of this type preferably include an internal condenser, an entrainment bottle or separator, and vacuum pumping equipment, and are therefore complicated. These are auxiliary pieces of equipment, however, that render the apparatus suitable for molecular distillation; and these items can be omitted where their function is not needed, such as for example, for the pasteurization of milk.

Referring now to the drawings by numerals of reference, the still is formed with a dished base 20 that can be supported on a concrete support (not shown), or in any other convenient manner. This base 20 is formed with a center opening, and the casing 21 of a high vacuum diffusion pump is mounted, in vacuum-tight fashion, in this opening in the base. The casing 21 is formed with an upper portion that projects axially above the base 20 and with a lower portion that projects below the base 20, and these two portions are generally cylindrical and integral. The casing 21 is formed with an arm 22, for connection to a fore-pumping system, that projects from the lower end of the casing 21, beneath the base 20 of the still. A cooling coil 24 is secured to the exterior of both portions of the pump casing.

A pair of concentric, upstanding wall members 25, 26, respectively are secured to the upper surface of the base 20 to subdivide it into two concentric reservoirs, for a purpose to be described presently. The inner reservoir, that is formed between the inner ring 25 and the outer ring 26, can be drained through a nipple 27 that projects through the base 20. The outer reservoir, that is formed by the outer ring 26, can be drained through a nipple 28 that projects through the base 20. The base is also formed around its periphery with a radially projecting flange 30, and a gasket 31 is disposed in a channel that is formed in the flat upper surface of the flange 30.

A generally cup-shaped dome 32 seats on the base 20. The dome 32 is formed with a peripheral flange 34 at its lower, open end, and this flange seats on the flange 30, to compress the gasket 31. The base 20 is formed with three upwardly directed lugs 35 that have conical inner surfaces to guide the flange 34 to its proper seating position on the flange 30.

The base 20 and dome 32 are formed of corrosion resistant, heat conductive metal, such as, for example, stainless steel, as are many of the other parts of the still. Many other metallic materials could also be used, and materials having good thermal conductivity are preferred. Glass-coated steel could be used, but because of its relatively poor thermal conductivity, it is not a preferred material. A heating jacket 36 is secured to the outer surface of the dome 32. This heating jacket 36 is constructed in a particular way, to provide a turbulent flow of heat exchange fluid in contact with the dome. The jacket is formed by securing a length of curved tubing, that has a cross-section that is curved in an arc that is one-third the circumference of a circle, to the outer surface of the dome 32 in a substantially helical path. The tubing is secured to the outer surface of the dome 32 along one of its lateral edges, by welding, or in any other convenient, fluid-tight fashion. Each convolution of tubing overlaps one adjacent convolution, and is welded along its other lateral edge to the overlapped convolution. A continuous passageway is thus provided that follows a helical path around the dome. This type of jacket is easily fabricated and provides an optimum ratio of surface area, that is in direct contact with the heat exchange fluid, to surface area that is in contact only with the tubing. This jacket is closed at its upper and lower ends, and nipples 37 and 38 are secured to the lowermost and uppermost convolutions of the jacket, respectively, to admit and to discharge heat exchange fluid, respectively.

An electric motor and reduction gear 39 is mounted on the upper, closed face of the dome, and is supported thereon by a bearing support 40 on which are mounted a pressure-sealed stuffing box and bearing indicated generally at 41. A shaft 42, that is driven by the reduction gear, projects downwardly through the stuffing box 41 to the interior of the dome. A collar 43 is secured to the lower end of this shaft, and a pair of plates 44, 45, are secured to the collar 43, in axially-spaced relation to each other. A plurality of webs 46 (FIG. 2) are interposed between the two plates 44, 45, and are welded to each of these plates, to provide a rigid structure. Four nipples 47 are welded to the upper surface of the upper plate 45, with their bores aligned with apertures in this plate, to permit the passage of vapor freely from one side of the plate 45 to the other. A cylindrical wall 48 is secured to the upper surface of the upper plate 45, spaced slightly radially inwardly of the periphery of the plate.

The rigid structure that is formed by the two plates 44, 45, and the vertically-extending webs 46, supports a framework that includes four vertically-extending, generally U-shaped channel members 50 that are welded at their upper ends to the upper plate 45, and slightly below their upper ends, to the lower plate 44. The lower ends of the channel members 50 are secured together by a ring 51 (FIG. 2). The ring 51 includes a vertically-extending web portion and a radially extending web portion that are integrally united; and the radially extending portion provides a stop at the lower end of each of the channels 50.

A plurality of wiper elements 52 are mounted in each channel member 50, in columnar fashion, one above the other. These wiper elements 52 are free to move radially relative to the dome 32 under centrifugal force when the frame or rotor is rotated upon rotation of the shaft 42. To facilitate the independent radial movement of the wiper elements, each element is formed with a rounded top, as shown in FIG. 1, and with a flat bottom, as is more clearly shown in FIGURE 11. This permits the elements to make line contact with each other, so that frictional resistance to free sliding movement is minimized. The sides of each wiper element 52 are flat and engage the opposed arms of the channel member 50, in which it is seated, in sliding relation.

The wiper elements 52 preferably are made from a tough plastic material, such as, for example, polytetrafluoroethylene, with or without added graphite as a filler and lubricant; or from bonded carbon, or like material that will engage the cylindrical inner surface of the dome 32 with some degree of self-lubrication so that the surface of the dome is not scored as the wiper moves over it. Other materials that can be employed for constructing the wiper elements 52 include carbon-graphite compositions, molded nylon, a molded mixture of polytetrafluoroethylene and molybdenum disulphide, and, as well, some of the thermosetting plastic materials including phenolic resins and melamine resins. In general, materials suitable for making the wiper elements are those that have good wearing qualities, and that are easily molded or machined, and that are inert chemically and stable thermally.

Figure 6:
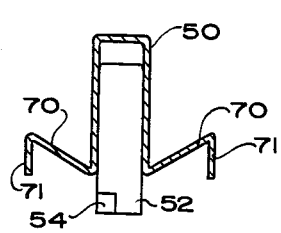
FIG. 6 is a section taken substantially on line 6—6 of FIG. 5, looking in the direction of the arrows.
Figure 5:
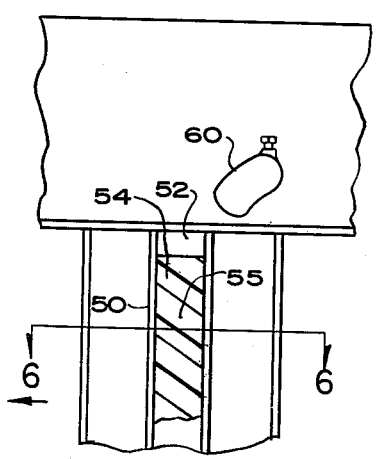
FIG. 5 is a fragmentary partial front elevation of the part shown in FIG. 4, on substantially the same scale, and with the cylindrical evaporating surface removed in order to show the wiper and its retainer, and illustrating a preferred form of wiper construction.
Figure 7:
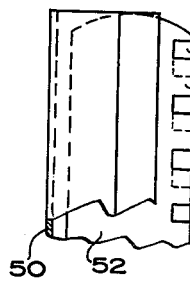
FIG. 7 is a fragmentary side elevation of the wiper and retainer shown in FIG. 6, with the retainer partly broken away.

Referring now particularly to FIGS. 5 through 7, each wiper element 52 is formed, on its radially outer face, with a plurality of slots 54 that separate radially outwardly projecting portions or lands 55. These slots 54 may be molded or machined in each wiper element. The sides of the slots 54 are disposed in parallelism and at an acute angle to a plane that is perpendicular to the axis of the dome 32. Referring to the direction of rotation of the rotor and of the wiper elements, the edges of the slots 54 are inclined downwardly from their leading edges. In the embodiment of the invention illustrated in FIG. 5, the leading and trailing edges of each of the lands 55 extend vertically, that is, axially with respect to the inner or evaporating surface of the dome 32.

To supply liquid to the still, a line 56 is secured to the top of the dome to be connected to a liquid supply. The line 56 communicates within the still with a pressure relief valve 57, from which the liquid can flow through a short outlet pipe 58. The pipe 58 is disposed to deposit the liquid on the upper surface of the plate 45, at a point spaced inwardly from the other edge of this plate, and radially outwardly from the nipples 47. This permits all of the liquid delivery piping up to the valve 57 to be under pressure, thus avoiding the tight sealing joint difficulty that is usually encountered in vacuum conduits. Ordinarily, the still will be in operation when the liquid flows onto the upper surface of the plate 45 from the outlet pipe 58, and the plate 45 will be rotating at a high rate of speed. Centrifugal force will distribute the liquid in a thin film over the surface of the plate 45, and it will accumulate at the wall 48. Four adjustable nozzles 60 are mounted in the wall 48 to permit the liquid to escape. The nozzles 60 disposed to dispense fluid onto the inner surface of the dome 32, at the trailing sides of the wiper elements 52 respectively.

A generally cylindrical, tubular condenser 61 is mounted in the still, in radially-spaced relation inwardly of the four channel members 50, and concentrically of the evaporating surface of the dome 32. The inwardly projecting upper end of the pump casing 21 projects upwardly into the lower end of the condenser 61. A cooling fluid input line 62 and a discharge line 64 are connected through the still base 20 to the condenser. The condenser 61 is formed with a plurality of vertically-extending tubes that are angularly spaced from each other, and that are connected at their upper ends and lower ends respectively to manifold rings 65, 66. The cooling fluid input line 62 is connected to the lower ring 66, and the discharge line 64 is connected to the upper ring 65 of the condenser.

For efficient distillation, the path between the evaporating surface and the condenser tubes must be free for the passage of vapor, but drops of liquid caused by splashing, for example, and entrainment, should be prevented from reaching the condenser. To prevent liquid from passing from the inner surface of the shell 32 to the condenser 61, each channel member 50 is formed with generally laterally extending wings 70, and with generally radially extending arms 71 that are integral with the wings 70 at their outer ends. An entrainment separator, that comprises a plurality of generally V-shaped fins 72 that are vertically extending and in angularly spaced relation to each other, also prevents liquid from reaching the condenser 61. The fins 72 are secured at their upper and lower ends respectively to the plate 45 and to the lower ring 51. The fins 72 are disposed with their apices pointed in the direction of rotation of the rotor. The apices of the four fins 72, that are adjacent the four channel members 50, are interposed between the wings 70, on one side of each of these channel members, and the condenser, as best shown in dotted lines in FIG. 4; and the trailing edges of the four fins that are adjacent the other sides of the four channel members are extended to be interposed between the other wings 70 of the four channel members and the condenser.

The vertically-extending condenser tubes are welded to, and open at both ends into, the top and bottom manifold rings 65, 66 respectively. The condenser tubes preferably have a circular horizontal section. The upper manifold ring 65 has an outer diameter that permits of clearance for the rotor parts, including the fins 72 of the entrainment separator and the back portions of the channel members 50. The lower manifold ring 66 is supported from the base 20 of the still by brackets 68 that are arranged at angularly spaced locations. The condenser is supported entirely from the base 20 of the still, and is free standing, without any support from the sidewalls of the still, and without any interference with the rotor. Therefore, when the dome 32 is lifted to permit cleaning of the still, for example, the dome 32 lifts freely from the base 20 and the rotating parts are lifted up with the dome 32, including the entrainment separator fins 72, the channel members 50, and the wiper elements 52 that are seated in the channel members; and the condenser is left standing on a base 20.

The outlet openings at the upper ends of the vertical condenser tubes, where they enter the upper, outlet manifold ring 65, are preferably substantially of the same size as the internal diameter of the tubes. However, to promote uniform flow of the cooling fluid through all of the condenser tubes, it is preferred that the inlet openings from the lower manifold ring 66 into the bottom ends of the condenser tubes be considerably restricted, preferably having an area approximately equal the cross-sectional area of the inlet line 62, divided by the number of vertical tubes in the condenser. This promotes an approximately uniform flow of heat exchange fluid through all of the condenser tubes, and avoids any concentration of flow of the heat exchange fluid through the few tubes that are closest to the inlet line 62.

Preferably, the vertical condenser tubes are of circular cross-section, and are spaced angularly from each other at center to center distances of approximately twice the diameter of each tube, so that there is clearance between each pair of adjacent tubes approximately equal to the diameter of one tube. The fins 72 of the entrainment separator are disposed to prevent any direct movement of liquid from the evaporating surface of the dome 32 to the condenser tubes, but vapor can move freely from the evaporating surface to the condenser, through the spaces between adjacent fins.

While I have shown a preferred form of entrainment separator, it will be understood that the entrainment separator may have other shapes, such as, for example, the shape illustrated in FIG. 14 of my copending application, Serial No. 571,626, filed March 15, 1956, and now U.S. Patent No. 2,955,990. Preferably, the surfaces of the entrainment separator are highly polished and possessed of specular reflectivity, to reflect radiant heat from the evaporating surface of the dome 32 back toward the evaporating surface.

To permit measurement of the pressure within the still, when operating at reduced pressures, a nipple 74 (FIG. 1) can be connected to the upper part of the dome 32. For operation of the still at high temperatures, a cooling chamber 75 may be provided in the flange 34, adjacent the gasket 31, for the passage of cooling fluid to keep the gasket 31 cool so that it will not deteriorate at high operating temperatures.

Figure 8:
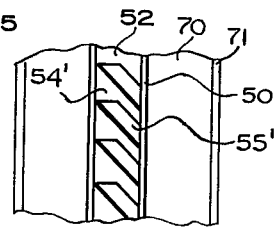
FIG. 8 is a fragmentary front elevation of a modified type of wiper constructed according to another embodiment of the invention, and showing the wiper substantially in the same position as the wiper shown in FIG. 5.

Referring now to FIG. 8, the slots 54' of wipers 52', constructed according to a modified form of the invention, may be widened at their leading edges so that the lands 55' present a knife edge to the liquid film on the surface of the dome 32. The grooves and slots may also take different forms, and for some purposes, may even be directed upwardly from leading edge to trailing edge. According to the preferred embodiment of the invention, the grooves extend obliquely downwardly from leading edge to trailing edge, and are sufficiently angled to the direction of rotation so that the trailing edge of one land overlaps the leading edge of the next land below it. With this construction also, as the wiper element is moved over the evaporating surface of the dome 32, upon rotation of the rotor, the entire evaporating surface is wiped by one or another of the lands, so that there is no area of the evaporating surface that is not wiped.

Figure 9:
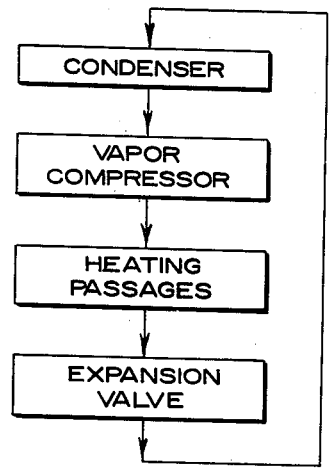
FIG. 9 is a schematic diagram showing the closed thermal circuit that I prefer to employ.

Referring now to FIG. 9, the condenser 61 in the still, and the heating passages or jacket 36 on the outer surface of the dome 32, preferably form a part of a closed thermal circuit that includes, in addition to connecting piping, a vapor compressor and an expansion valve, connected serially as shown in FIG. 9.

Figure 10:
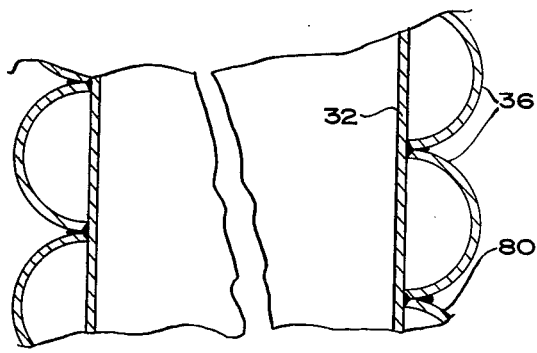
FIG. 10 is a partial and fragmentary side elevation of a still body having a modified form of heating means, according to another embodiment of this invention.

Referring now to FIG. 10, the heating jacket 36' may also be constructed advantageously by the use of a curved tubing section 80, that has a cross-section that is curved to an arcuate length of one-half the circumference of a circle. This tubing section 80 is secured to the outer surface of the dome 32 along both of its lateral edges, by welding, or in any other convenient, fluid-tight fashion. The tubing section is wound around the exterior of the still 32' in a generally helical path. Each lateral edge of each convolution of the tubing is continuous with the lateral edge of an adjacent convolution.

To operate this still for high vacuum distillation to recover vitamin A from fish oil, for example, the motor 39 is energized to rotate the shaft 42 in a generally clockwise direction relative to FIG. 4. As the rotor is rotated, the wiper elements 52 are thrown radially outward under centrifugal force, independently of one another, however, until each wiper element engages the surface of the cylindrical wall 32. The pumping system is operated to reduce the pressure in the still to a desirable operating pressure, which ordinarily will be in the neighborhood of one micron of mercury for this particular type of operation. For vacuum distillation work, the fore pumping system should be capable of reducing the still pressure to about 100 microns or less. The diffusion pump may be operated to achieve pressures on the order of 10 microns and less.

Refined, degassed fish oil is pumped into the still through the inlet pipe 56, the pressure relief valve 57, and through the discharge pipe 58, and falls onto the upper surface of the plate 45, which is rotating at the same speed as the rotor. The rotor speed ordinarily is below 100 r.p.m., such as, for example, on the order of about 60 r.p.m., for a rotor having a diameter on the order of thirty-six inches. The liquid is distributed over the upper surface of the plate 45 in a thin film. Under the low pressure prevailing in the still, a rapid final degassing takes place. The liquid builds up at the wall 48, and escapes through the nozzles 60. The nozzles discharge the liquid onto the inner surface of the dome 32, and the liquid tends to flow downwardly over the dome surface, under the influence of gravity, in a thin film.

The leading edges of the wiper elements 52 strike the liquid film substantially immediately after it has begun its downward travel, and remove it from the surface by a scraping or wiping action. With wiper elements having the shape shown in FIG. 5, the liquid tends to accumulate briefly at the leading edges of the lands 55, then runs into the slots 54, where it is accelerated downwardly and then discharged back onto the surface, again to form a thin, downwardly flowing film under the influence of gravity. Substantially immediately, the reformed film is again wiped from the surface, accumulated briefly at the leading edges of the following wiper lands and mixed and agitated at the same time, then again accelerated downwardly, and again discharged onto the surface once more to form a film. This process of film formation, removal by wiping, downward acceleration, and reapplication to the surface at an axially downward location on the evaporating surface, continues so that the liquid progressively traverses the axial length of the evaporating surface. Eventually, the liquid drops off the lower end of the evaporating surface and accumulates behind the annular wall 26, and eventually is withdrawn from the still through the discharge nipple 28. Transit time through the still is exceedingly brief, because of the accelerating or pumping action of the wipers.

Heat exchange fluid, such as, for example, warm ammonia, in liquid or vapor form, is passed in turbulent flow from the nipple 37 through the convolutions of the jacket 36, thence out through the discharge nipple 38. Heat is transferred from the ammonia to the wall of the dome 32, thence to the film of oil on the inner, evaporating surface of the dome 32. When discharged through the nipple 38, the ammonia is cooler, and it is passed through an expansion valve (not shown), to permit it to cool itself further, by absorption of internal heat upon expansion. Cold ammonia vapor is then passed into the condenser through the nipple 62, to pass upwardly through the condenser tubes into the manifold ring 65, and thence be withdrawn from the condenser through the discharge outlet 64. In the condenser, the heat exchange medium cools the condenser tubes, and takes on heat from the condensing vapor, and thus is warmed by its passage through the condenser. The warmed heat exchange medium is then passed into a compressor (not shown) which compresses it, preferably to liquid form, and raises its temperature. The hot heat exchange medium is then passed back through the heating jacket 37, and so on.

Many fish oil distillations can be carried out satisfactorily when the temperature of the residue leaving the still through the line 28 is on the order of 250° C. Pressure and temperature conditions must be adjusted, however, to suit the particular type of oil that is being distilled, and in general, molecular distillation is most easily and accurately controlled through continuous observation of the rate of distillation.

As the liquid film progressively traverses the axial length of the evaporating surface, the oil is heated to progressively higher temperatures, and the volatile components of the oil, including the vitamin A, vaporize and condense on the cool condenser tubes 61. The condensate runs down the tubes into the base of the still 20, and accumulates in the reservoir that is formed by the annular baffle 25, for eventual withdrawal from the still through the nipple 29.

Since the wipers have a scraping action that removes the liquid film positively from the evaporating surface, mixes the removed liquid, and then accelerates or pumps the liquid downwardly through the still, exceptionally viscous materials can be handled successfully for high vacuum distillation, for low vacuum distillation, for concentration, or for evaporation, or simply for heat exchange. Moreover, since the wiper elements are free to move radially independently of each other, under the influence of centrifugal force as the rotor is rotated, the entire inner surface of the dome 32 is continuously wiped, even though the dome surface may not be exactly truly cylindrical. This continuous, universal wiping action prevents the formation of hot spots where burning and charring can occur, and thus prevents the formation of carbon deposits.

The speed of rotation of the wipers is such that the liquid velocity, axially of the heated evaporating surface, permits the liquid to be acted upon by three, four, or more columns of wipers, as the liquid traverses the still. The film of liquid often is so thin that, on the interior surface of a transparent dome, the film is substantially invisible, and the wipers perform their function without visible effect by way of splashing or the like. However, the effects of the wipers can be observed and measured quantitatively by performance of the still or heat exchanger. Quantitative measurements indicate that the wipers maintain a sufficient state of turbulence to develop U values on the order of eight thousand to nine thousand B.t.u. per hour per square foot per ° F., from the metal wall of the dome 32 into the liquid in the film. By maintaining the heat exchange medium in turbulent flow also, U values of the same order can be attained on the jacket side of the dome.

While I prefer to use the closed thermal circuit shown in FIG. 9, in many cases, superheated, high velocity steam can be passed through the jacket 36 in turbulent flow, and U values on the order of eight thousand to nine thousand B.t.u. per hour per square foot per ° F. can be obtained from the steam to the metal wall.

For low temperature distillation, evaporation, or concentration, "Freon" gas, such as is used in domestic refrigerators, can be employed satisfactorily in a closed thermal circuit, to cool the condenser and to heat the heating jacket 36. To obtain effective heat exchange at higher temperatures, silicone oils may be used, or preferably cuts of fluorocarbon may be used, such as, for example, polymers of chlorotrifluoroethylene. The exact composition of polymers of this type is determined by the temperature used in taking the cut out of the mixture of such polymers, and considerable variation is possible. Among the specific polymers of this type that may be used, for example, is "Kel-F" No. 10 fluorocarbon polymer, as manufactured by the M. W. Kellogg Company; and "Aroclor" No. 1242, a product of the Monsanto Chemical Company.

When my apparatus is used as a heat exchanger, as, for example, in the pasteurization of milk, many of the parts illustrated in FIG. 1 can be omitted from the apparatus if desired, since their function is not needed. Thus, for example, the entrainment separator, condenser, and diffusion pump can be omitted entirely. My apparatus is particularly advantageous for pasteurization because the milk or other liquid food undergoes an extremely short exposure time to the high temperature on the shell wall, and because the milk is kept agitated by the action of the wipers, so that localized overheating does not occur, and the heat exchanger operates free from burning, charring, and the formation of localized brown spots within the equipment.

My apparatus is particularly valuable for processing foods, and related products. For example, my apparatus is valuable for cooling hot gelatinous solutions such as are obtained in the preparation of edible gelatin and glue, and also for simultaneously cooling and concentrating the solutions. Ordinarily, the hot solutions from the rendering tanks are chilled to lower the temperature to the gelation point, and then are dried, to produce a product that can be further processed or shipped. With my apparatus, I am able to feed into the still hot gelatinous solutions at temperatures on the order of 175° F. and concentrations of 20% to 40% by weight, and concentrate these solutions under vacuum extremely efficiently, while cooling these solutions partly by cooling the heat exchange fluid in the jacket of the still, and partly by the removal of heat of evaporation of some of the water from the solutions. Since the concentrated gelatinous solutions are extremely viscous, a process of this type is feasible only because the wipers exert a positive pumping action to force the gelatinous solutions through the equipment. The concentrated solutions can then be processed or dried further.

My apparatus is also extremely valuable for heating and for cooling fats and oils, and other such viscous materials. It is also advantageous for use in concentrating maple syrup, and for similar food processing applications.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or in the limits of the appended claims.

Having thus described my invention, what I claim is:

1. In a liquid processing apparatus of the mechanically aided falling film type, having a internal surface of revolution, wherein liquid is caused to flow over said surface, and also having a rotor mounted for rotation about an axis that is disposed within said surface, means mounted on said rotor for supporting and guiding a plurality of wiper blades, a plurality of separate wiper blades that are mounted contiguously on said rotor one above the other in a column, end to end, to extend generally along the direction of liquid flow, and wherein the individual blades are mounted to move independently of each other in a generally radial path that is substantially normal to said surface in sliding, guided engagement with said means, and wherein said blades and said means have broad bearing areas of substantial extent normal to said surface engaged in sliding relation to present said blades at a constant orientation relative to said surface, to engage the surface to remove the liquid therefrom during operation of the apparatus, and wherein each blade is formed with alternating lands that engage the surface and recesses that extend between the lands and that are of substantial extent to provide mixing channels for removed liquid passing therethrough, the improvement wherein one end of each wiper blade is curved about an axis that is perpendicular to the radial path in which the wiper blade can move, and the opposite end is substantially flat, and the superposed blades are arranged so that the curved end of one blade engages against the flat end of the adjacent blade, to provide for antifriction contact between contiguous blades during radial movement of the blades toward and away from said surface of revolution.

2. Heat exchange apparatus for improving the heat exchange efficiency through a cylindrical, thermally conductive shell that has an upright axis, between a heat exchange fluid medium that is caused to flow over the external surface of the shell and a liquid that is caused to flow over the internal surface of the shell, both of which flows are characterized by the formation of relatively stagnant thin boundary films adjacent the respective surfaces of the shell, which films retard heat exchange, comprising a rotor that is mounted for rotation about an axis that is disposed within said shell, means mounted on said rotor for supporting and guiding a plurality of wiper blades, a plurality of separate wiper blades that are mounted contiguously on said rotor one above the other in a column, end to end, to extend generally along the direction of liquid flow, and wherein the individual blades are mounted to move independently of each other in a generally radial path that is substantially normal to the internal surface of said shell, and in sliding, guided engagement with said means, and wherein said blades and said means have broad bearing areas of substantial extent that extend generally radially relative to said internal surface and that are engaged in sliding relation to present said blades at a constant orientation relative to said internal surface to engage the internal surface to remove the liquid therefrom during operation of the apparatus, and wherein one end of each wiper blade is curved about an axis that is perpendicular to the radial path in which the wiper blade can move, and the opposite end is substantially flat, and the superposed blades are arranged so that the curved end of one blade engages against the flat end of the adjacent blade, to provide for antifriction contact between contiguous blades during radial movement of the blades toward and away from said internal surface, and wherein each blade is formed with alternating lands that engage the internal surface and recesses that extend between the lands and that are of substantial extent to provide mixing channels for removed liquid passing therethrough, and means for providing a continuous flow of heat exchange fluid medium over the external surface of said shell in contact therewith and in turbulent flow.

3. Heat exchange apparatus in accordance with claim 2 wherein said means for providing a continuous flow of heat exchange fluid medium over the external surface of the shell comprises a length of piping of concave transverse cross-section, that is wound helically about said shell on its external surface, in fluid-tight fashion, for providing the turbulent flow of the heat exchange fluid medium in direct contact with the external surface of said shell.

References Cited in the file of this patent

UNITED STATES PATENTS

| | | |
|---|---|---|
| 896,551 | Jurgens | Aug. 18, 1908 |
| 1,025,772 | Willman | May 7, 1912 |
| 1,154,772 | Hollstein | Sept. 29, 1915 |
| 1,693,034 | Jensen | Nov. 27, 1928 |
| 2,023,607 | Miller | Dec. 10, 1935 |
| 2,484,445 | Bibby | Oct. 11, 1949 |
| 2,493,220 | Bibby | Jan. 3, 1950 |
| 2,504,465 | Sticelber | Apr. 18, 1950 |
| 2,836,235 | Koffler | May 27, 1958 |

FOREIGN PATENTS

| | | |
|---|---|---|
| 330,805 | Great Britain | June 19, 1930 |